United States Patent [19]

Dwiggins

[11] Patent Number: 4,733,705

[45] Date of Patent: Mar. 29, 1988

[54] TIRE SHOE

[76] Inventor: Alvin S. Dwiggins, Rte. 1, Box 211, Amity, Ark. 71921

[21] Appl. No.: 866,712

[22] Filed: May 27, 1986

[51] Int. Cl.⁴ .............................................. B60C 11/02
[52] U.S. Cl. .................................... 152/177; 152/175; 152/185.1; 152/187; 152/189; 152/213 A; 152/340.1
[58] Field of Search ...................... 152/185, 185.1, 187, 152/188, 189, 191, 173, 175, 176, 213 A, 213 R, 339.1, 340.1, 177, 178, 179, 190, 186

[56] References Cited

U.S. PATENT DOCUMENTS

| | | |
|---|---|---|
| 777,979 | 12/1904 | Savignac . |
| 802,735 | 10/1905 | Casavant . |
| 945,115 | 1/1910 | White .................................. 152/178 |
| 1,027,108 | 5/1912 | Dorgan . |
| 1,062,070 | 5/1913 | Wilcox . |
| 1,121,070 | 12/1914 | Copithorn ........................... 152/187 |
| 1,351,664 | 8/1920 | Laley .................................... 152/191 |
| 1,417,755 | 5/1922 | Lome . |
| 1,441,262 | 1/1923 | Bardo et al. ......................... 152/187 |
| 1,753,519 | 4/1930 | Kanner ................................. 152/187 |
| 1,989,402 | 1/1935 | Cupp . |
| 2,157,004 | 5/1939 | Nelson, Jr. .......................... 152/189 |
| 2,365,279 | 12/1944 | Kraft . |
| 2,392,577 | 1/1946 | Castricum . |
| 2,574,267 | 11/1951 | Khalil . |
| 2,580,272 | 12/1951 | Bell . |
| 2,735,471 | 2/1956 | McLean . |
| 2,957,509 | 10/1960 | Johnson .............................. 152/173 |
| 3,004,576 | 10/1961 | Morse . |
| 3,091,821 | 6/1963 | Cook . |
| 3,254,692 | 6/1966 | Travers . |
| 3,403,429 | 10/1968 | Smith . |
| 3,797,549 | 3/1974 | Lieberum . |
| 3,844,325 | 10/1974 | Betancourt . |

Primary Examiner—Jerome Massie
Assistant Examiner—Geoffrey L. Knable
Attorney, Agent, or Firm—Bacon & Thomas

[57] ABSTRACT

A tire shoe for replacing or changing the existing tread of a tire, the shoe including sidewalls provided with spaced closures and fasteners, and an inflatable bladder in an annular space between the shoe and the tire for securing the shoe in its position of use.

7 Claims, 6 Drawing Figures

TIRE SHOE

BACKGROUND OF THE INVENTION

1. Field of the Invention

The present invention generally involves the field of technology pertaining to vehicle tires. More particularly, the invention relates to an improved tire shoe for replacing or changing the existing tread design of a tire.

2. Description of the Prior Art

Vehicle tires are basically formed of rubber material and defined by a tread portion and a pair of inwardly directed sidewall portions. In practically all circumstances of use, the tread of a tire is normally worn away much faster than the sidewalls, thereby requiring replacement of the entire tire, notwithstanding the structural soundness of the sidewalls. In compensating for this situation, the prior art has recognized that a new tread may be permanently secured to a tire having a worn tread but sound sidewalls.

The tread design of a tire is important in determining the type of driving condition under which a vehicle may be subjected. A general purpose tread design permits the vehicle to be driven under most conditions, but the presence of snow and ice requires a more aggressive tread design. Moreover, when a vehicle is driven on off-road terrains, very substantial high profile tread designs are required for accommodating these rougher conditions.

In view of the foregoing, it is therefore highly desirable to provide some means for easily replacing the tread of a tire so as to either effect a repair of the existing tread or change the tread design so as to permit the tire to safely accommodate different driving conditions.

SUMMARY OF THE INVENTION

It is an object of the present invention to provide an improved tire shoe for replacing or changing the existing tread of a tire.

It is another object of the invention to provide an improved tire shoe which may be quickly attached to or removed from an existing tire for the purpose of replacing or changing the tread design of the tire.

It is a further object of the invention to provide an improved tire shoe which remains safely and securely attached to an existing tire under all driving conditions.

These and other objects of the invention are realized by providing a tire shoe having the general configuration of a tire and defined by a tread portion, two sidewall portions and two bead portions. At least one sidewall portion is radially sectioned to form a plurality of flaps which are spread open to permit attaching the shoe to the tire. The corresponding radial edges of adjacent flaps are provided with closures for securing the flaps together so as to define a unitary sidewall. The bead portions of the flaps are each provided with a cable, and the corresponding ends of adjacent cables are provided with a fastener at the region of each closure. An annular air bladder is disposed between the shoe and tire, and is inflated to urge the shoe radially outwardly, thereby causing its sidewall and bead portions to tightly engage against the sidewalls of the tire.

Other objects, advantages and features of the invention shall become apparent from the following detailed description thereof, when considered in conjunction with the drawings wherein like reference characters refer to corresponding parts in the several views.

DETAILED DESCRIPTION OF THE PREFERRED EMBODIMENT

Figure 1:
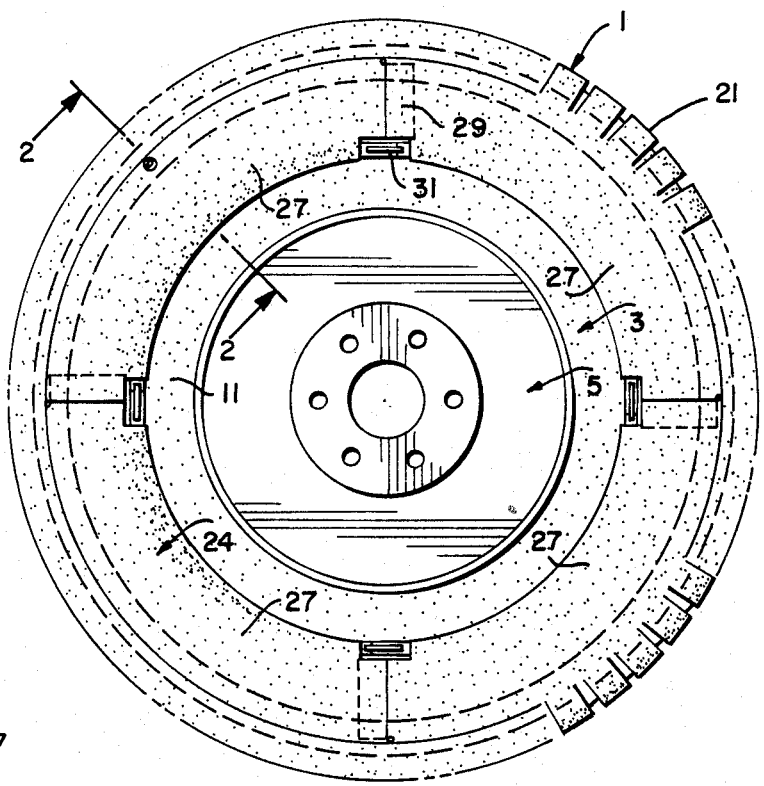
FIG. 1 is a plan view of a tire shoe according to a preferred embodiment of the invention shown in its attached position of use on a tire.

A tire shoe 1, according to a preferred embodiment of the invention, shall now be described with initial reference to FIGS. 1 and 2. As shown therein, shoe 1 is depicted in its position of use on a conventional tire 3 which is in turn mounted on a conventional metal wheel 5. Tire 3 is generally defined by a tread 7, a pair of opposed sidewalls 9 and 11, and a pair of beads 13 and 15, the latter being secured against a pair of corresponding rim edges 17 and 19, respectively, of wheel 5 when tire 3 is inflated to its operating pressure.

Tire shoe 1 also includes a tread portion 21, a pair of opposed sidewall portions 23 and 24, and a pair of bead portions 25 and 26. As apparent in FIG. 2, shoe 1 is configured and sized for fitting over tire 3 in such a manner that sidewall portions 23 and 24 extend radially inwardly for a substantial distance along sidewalls 9 and 11 of tire 3 and snugly engage same.

As seen in FIG. 1, sidewall portion 24 of shoe 1 is radially sectional so as to define four flaps 27, the corresponding edges of adjacent flaps 27 being secured together by a closure 29 and a fastener 31, the details of which shall be later described. Though four flaps 27 are shown, it is understood that a greater or lesser number may be utilized so long as the intent and purpose of the invention as disclosed herein can be realized. Moreover, opposed sidewall portion 23 of shoe 1 may also be sectioned in the manner described for sidewall portion 24, if desired for facilitating storage of shoe 1, but it is only required that a single sidewall be sectioned for practice of the invention.

Figure 2:
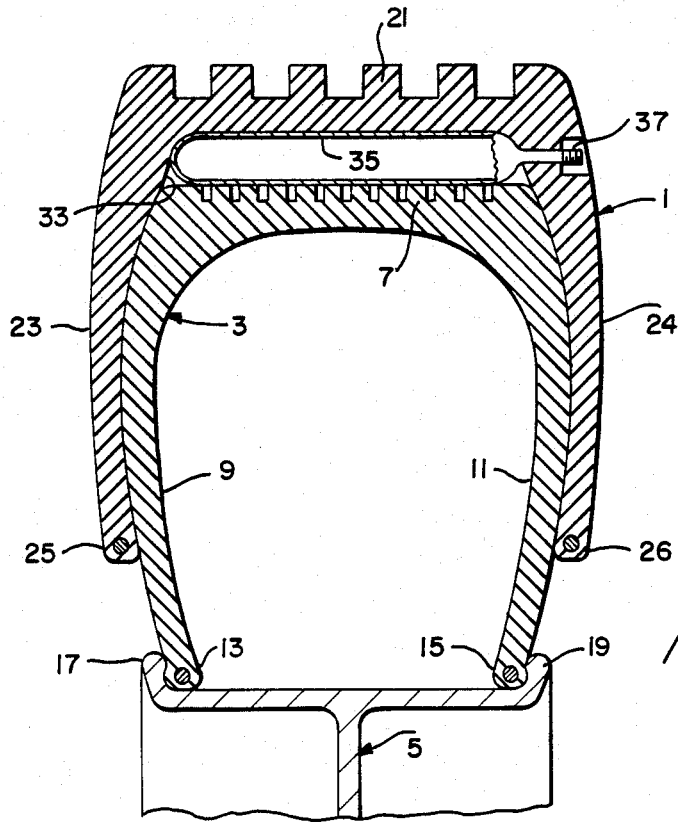
FIG. 2 is a cross-sectional view taken along the line 2—2 of FIG. 1 and showing the air bladder between the shoe and the tire.

As further seen in FIG. 2, the disposition of shoe 1 over tire 3 in its position of use serves to define an annular space 33 between the exterior surface of tread 7 and the interior surface of tread portion 21. Space 33 is provided with an inflatable air bladder 35 of rubber or other appropriate flexible material. Bladder 35 includes a conventional air valve stem 37 for the purpose of inflating bladder 35 with air in the same basic manner that tire 3 is conventionally inflated. Inflation of bladder 35 urges shoe 1 radially outwardly, thereby causing sidewall portions 23,24 and bead portions 25,26 to become securely locked against sidewalls 9 and 11 of tire 3. This is realized by virtue of the inwardly directed configuration of sidewalls 23 and 24, which in turn correspond to the inwardly directed configuration of sidewalls 9 and 11.

As is apparent from FIG. 2, the configuration of sidewalls 9, 11 of tire 3 results from the conventional inflation of tire 3 which causes sidewalls 9 and 11 to bulge slightly outwardly and become inwardly directed towards each other in a radial direction towards rim edges 17, 19. Likewise, since sidewalls 23, 24 of shoe 1 extend radially inwardly for a substantial distance, at least beyond the maximum outward bulge of sidewalls 9, 11, i.e., the point of maximum cross-sectional width of inflated tire 3, sidewalls 23, 24 also assume a corresponding axially inwardly directed configuration towards each other, as shown in FIG. 2. By virtue of this configuration, inflation of bladder 35 urges shoe 1 radially outwardly, but shoe 1 is prevented from being pulled off of tire 3 since bead portions 25, 26 of shoe 1 are disposed inwardly of the outward bulges of sidewalls 9, 11 of tire 3. When bladder 35 has been inflated, shoe 1 becomes safely and securely locked onto tire 3 for all driving conditions appropriate for the design of tread portion 21.

Figure 3:
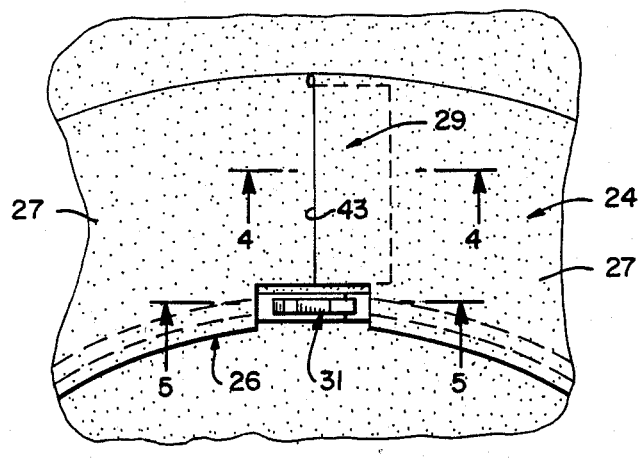
FIG. 3 is a fragmentary view of a sidewall portion of the tire shoe of FIG. 1, particularly showing the closure and the fastener disposed at corresponding radial edges of two adjacent flaps.
Figure 4:
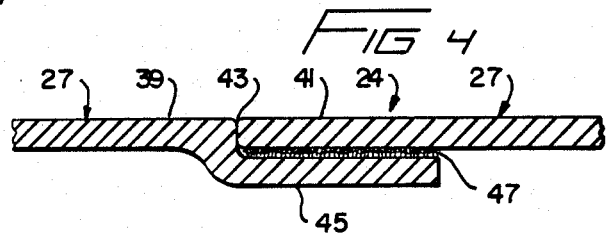
FIG. 4 is a cross-sectional view taken along the line 4—4 of FIG. 3.

The details of each closure 29 shall now be described with reference to FIGS. 3 and 4. As shown therein, each closure 29 is defined by a first end 39 and a second end 41 of adjacent flaps 27. Ends 39 and 41 have abutting edges which collectively define a line 43 which extends radially across substantially the entire width of sidewall portion 24. As more clearly seen in FIG. 4, first end 39 is provided with a flange 45 which extends inwardly and circumferentially of end 39, and disposed below second end 41. A pressure sensitive securing means 47, such as Velcro or the like, is provided on the opposed abutting surfaces of second end 41 and flap 45 to permit their detachable connection. With all four closures 29 secured in this manner, individual flaps 27 therefore form a continuous structure for sidewall portion 24.

Figure 5:
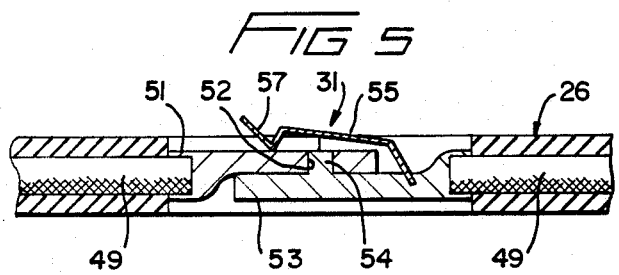
FIG. 5 is a cross-sectional view taken along the line 5—5 of FIG. 3.

The details of each fastener 31 shall now be described with reference to FIG. 5. As previously noted in FIG. 3, each fastener 31 is disposed at the inner end of line 43 at the circumferential axis defined by bead portion 26. Since sidewall portion 24 is sectioned into flaps 27, each flap 27 is provided with a discrete bead cable 49, one end of which is provided with a female connector 51 having a socket 52, while the other end is provided with a male connector 53 having a plug 54, wherein socket 52 is configured and sized to receive correspondingly configured and sized plug 54 in the manner shown in FIG. 5. Two corresponding ends of adjacent cables 49 connected in this manner are secured against inadvertent disconnection by means of a spring retainer 55 carried by male connector 53. Retainer 55 serves to maintain socket 52 firmly around plug 54, thereby only permitting their disconnection when retainer 55 is manually released by pulling on a tab 57 carried by retainer 55. When all fasteners 31 are secured, cables 49 form a continuous structure for bead portion 26.

As is apparent, the securing of all closures 29 and all fasteners 31, in the manner aforedescribed, serve to collectively define a continuous sidewall portion 24 and a continuous bead portion 26 after shoe 1 has been disposed in its position of use over tire 3.

The details of each closure 29 and each fastener 31 as described herein are of course preferred embodiments of same. It is nevertheless understood that other possible types of alternative structures for closure 29 and fastener 31 may also be utilized to advantage in the practice of the invention so long as the disclosed intent and purpose thereof are maintained.

Figure 6:
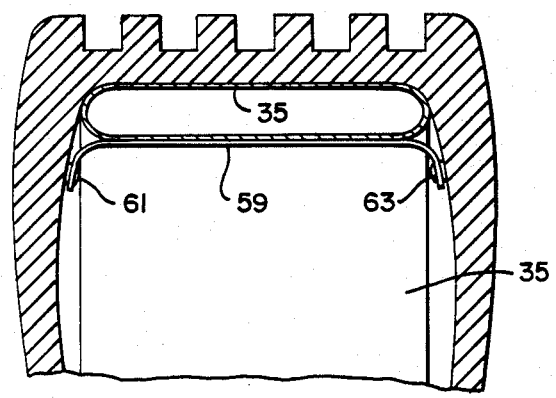
FIG. 6 is a partial cross-sectional view showing a retaining means for the air bladder.

With reference to FIG. 6, air bladder 35 is shown detachably secured within shoe 1 by means of a transverse strap 59 provided with a pair of conventional snap connectors 61 and 63 at its opposite ends. It is preferred that a plurality of such straps 59 be circumferentially spaced around the interior of shoe 1 in order to retain bladder 35 in its required position when attaching or removing shoe 1 with respect to tire 3.

Tire shoe 1 may be formed from the same type of materials normally utilized in the production of conventional tires and, accordingly, may also be made in substantially the same manner. As disclosed herein, shoe 1 is shown with a high profile or aggressive design for tread portion 21. It is understood that any appropriate or desired design may be utilized, depending on the anticipated driving conditions under which shoe 1 is to be subjected.

MODE OF OPERATION

In attaching tire shoe 1 to tire 3, closures 29 and fasteners 31 are initially disposed in their respective unsecured positions and bladder 35 is in its deflated condition. Flaps 27 are pulled outwardly to permit the insertion of tire 3 within shoe 1. Thereafter, closures 29 and fasteners 31 are placed into their secured positions in the manner previously described. This results in sidewall portions 23,24 and bead portions 25,26 of shoe 1 being disposed in abutting engagement against corresponding sidewalls 9 and 11, respectively, of tire 3, as shown in FIG. 2. Completion of this assembly is realized through inflating bladder 35 by connecting an ordinary service station air hose to air stem valve 37, thereby urging shoe 1 radially outwardly away from tire 3 and causing sidewall portions 23,24 and bead portions 25,26 to tightly embrace sidewalls 9 and 11.

As is apparent, the invention now provides a means for quickly and safely replacing or changing the tread portion of an existing tire in a manner that has heretofore not been possible with conventional technology.

It is to be understood that the embodiment of the invention herein shown and described is to taken as a preferred example of the same, and that various changes in shape, size, arrangement of parts, compositions and method of practice may be resorted to without departing from the spirit of the invention or the scope of the subjoined claims.

I claim:
1. A tire shoe for replacing or changing the tread of a conventional tire having a tread, a pair of sidewalls and a pair of beads, which shoe comprises:
  (a) an annular body defined by a circular tread portion, a pair of radially extending opposed sidewall portions, the sidewall portions terminating in a pair of circumferential bead portions;
  (b) the body being configured and sized for attachment around a conventional tire mounted on the rim of a wheel and inflated to an operating pressure so as to cause the sidewalls of the tire to bulge outwardly and assume an axially inwardly directed configuration toward each other, whereby the sidewall portions of the body may be disposed in snug engagement against the corresponding sidewalls of the tire and extending radially therealong for a substantial distance across the radial width of the sidewalls of the tire, with the bead portions of the body being disposed beyond the maximum outward bulge of the tire sidewalls so that the sidewall portions of the body assumes a corresponding axially inwardly directed configuration towards each other;

(c) the tread portion of the body including an inner surface which is spaced from and defines an annular space with the exterior surface of the tire tread when the shoe is in its position of attachment around the tire;

(d) each sidewall portion of the body being sectioned to define a plurality of flaps for permitting the shoe to be attached to or removed from the tire;

(e) the flaps including means for detachably securing same together;

(f) a separate inflatable air bladder disposed within the annular space for urging the shoe radially outwardly of the tire to cause the sidewall portions of the body to tightly embrace the sidewalls of the tire; and (g) whereby the shoe is maintained in its position of attachment around the tire by detachably securing the flaps together and inflating the bladder.

2. The shoe of claim 1 wherein each flap includes a discrete bead section, each bead section being provided with a bead cable, and the means for detachably securing the flaps together include a fastener for releasably connecting corresponding ends of adjacent bead cables together.

3. The shoe of claim 2 wherein each fastener includes a male connector carried on the end of one bead cable and a corresponding female connector carried on the end of an adjacent bead cable.

4. The shoe of claim 3 further including means for retaining the male and female connectors in their position of connection.

5. The shoe of claim 1 wherein each flap includes a first end and a second end, the first end terminating in an inwardly and circumferentially extending flange which overlaps the underside of the second end of an adjacent flap, and the means for detachably securing the flaps together includes releasable pressure sensitive means for securing the flange to the second end.

6. The shoe of claim 5 wherein the first end and second end of adjacent flaps include corresponding edges which collectively define a line that extends radially for substantially the entire width of each sidewall.

7. The shoe of claim 1 further including means for releasably securing the air bladder to the interior surface of the body.

* * * * *